United States Patent
Dale et al.

(10) Patent No.: US 10,519,811 B2
(45) Date of Patent: Dec. 31, 2019

(54) FLANGE HEAT SHIELD

(71) Applicant: UNITED TECHNOLOGIES CORPORATION, Farmington, CT (US)

(72) Inventors: Timothy Dale, Manchester, CT (US); Jonathan Jeffery Eastwood, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 532 days.

(21) Appl. No.: 15/284,763

(22) Filed: Oct. 4, 2016

(65) Prior Publication Data
US 2018/0094545 A1    Apr. 5, 2018

(51) Int. Cl.
*F01D 25/30* (2006.01)
*F02C 7/12* (2006.01)

(52) U.S. Cl.
CPC ............... *F01D 25/30* (2013.01); *F02C 7/12* (2013.01); *F05D 2260/231* (2013.01)

(58) Field of Classification Search
CPC ........ F01D 25/30; F01D 9/023; F01D 25/145; F01D 25/243; F02C 7/12; F02C 7/24; F23R 3/60; F05D 2240/15; F05D 2260/231; F05D 2260/31
USPC ......................................................... 415/178
See application file for complete search history.

(56) References Cited

U.S. PATENT DOCUMENTS

| | | | | |
|---|---|---|---|---|
| 5,201,846 A * | 4/1993 | Sweeney | .................... | F01D 9/04 415/170.1 |
| 6,227,798 B1 * | 5/2001 | Demers | ..................... | F01D 5/18 415/115 |
| 6,675,585 B2 * | 1/2004 | Calvez | .................... | F23R 3/007 60/753 |
| 8,459,941 B2 * | 6/2013 | Jasko | ...................... | F01D 9/041 415/190 |
| 2015/0252687 A1 | 9/2015 | Arnould | | |
| 2016/0123187 A1 * | 5/2016 | Leslie | ................... | F01D 25/145 415/134 |
| 2017/0336074 A1 * | 11/2017 | Sander | .................... | F23R 3/002 |
| 2018/0230856 A1 * | 8/2018 | Eastwood | ............. | F01D 25/243 |

FOREIGN PATENT DOCUMENTS

| | | |
|---|---|---|
| EP | 2549188 | 1/2013 |
| WO | 2014164189 | 10/2014 |
| WO | 2015054095 | 4/2015 |

OTHER PUBLICATIONS

European Patent Office, European Search Report dated Feb. 13, 2018 in Application No. 17191073.0.

* cited by examiner

*Primary Examiner* — Aaron R Eastman
(74) *Attorney, Agent, or Firm* — Snell & Wilmer, L.L.P.

(57) ABSTRACT

A flange heat shield is provided. The flange heat shield may comprise an annular body having a forward end opposite an aft end. The forward end of the flange heat shield may comprise a radial snap configured to interface with an inner surface of an engine case. The inner surface of the engine case may comprise an airflow ramp forward of the radial snap. The aft end of the flange heat shield may comprise a plurality of notches defining voids on the aft end. The aft end of the flange heat shield may also comprise mounting tabs configured to couple the flange heat shield to the engine case.

13 Claims, 8 Drawing Sheets

FLANGE HEAT SHIELD

FIELD

The present disclosure relates to gas turbine engines, and more specifically, to a flange heat shield for gas turbine engines.

BACKGROUND

A gas turbine engine typically includes a fan section, a compressor section, a combustor section, and a turbine section. In general, during operation air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section may typically include low pressure and high pressure compressors, and the turbine section may typically include low pressure and high pressure turbines.

The combustor is typically coupled to an engine case of the gas turbine engine. The engine case may include a diffuser case, which circumscribes the compressor section. The diffuser case and fittings may be subjected to relatively high temperatures due to heat convectively transferred from the combustor to the diffuser case. Thermal loads in the diffuser case may cause thermal gradients that may stress, deform, fracture, and/or degrade portions of the diffuser case over time. A flange of the diffuser case may experience thermal gradients of at least 400° F. (204° C.) to 600° F. (315° C.). Stress and degradation caused by the thermal gradients may shorten the operational life of engine case components.

SUMMARY

In various embodiments, a flange heat shield for an engine case of a gas turbine engine is disclosed. The flange heat shield may comprise an annular body having a forward end opposite an aft end. The flange heat shield may comprise a radial snap located on the forward end and configured to interface with a landing of the engine case. The flange heat shield may comprise a notch disposed at the aft end, wherein the notch defines a void located on the aft end. The flange heat shield may comprise a mounting tab located on the aft end.

In various embodiments, the notch may be configured to interface with a forward end of a vane support of the engine case. The mounting tab may be configured to couple the flange heat shield to the forward end of the vane support. In various embodiments, an outer surface of the flange heat shield and an inner surface of the engine case define a gap. In various embodiments, the flange heat shield may further comprise an airflow ramp located on an inner surface of the engine case forward of the landing. In various embodiments, the annular body may comprise a plurality of sectional heat shields coupled end to end to form the annular body. In various embodiments, the engine case may comprise a diffuser case.

In various embodiments, a gas turbine engine is disclosed. The gas turbine engine may comprise a combustor, a diffuser case disposed about the combustor, and a flange heat shield disposed between the combustor and the diffuser case. The flange heat shield may comprise an annular body having a forward end opposite an aft end. The flange heat shield may comprise a radial snap located on the forward end and configured to interface with a landing of the engine case. The flange heat shield may comprise a notch disposed at the aft end, wherein the notch defines a void located on the aft end. The flange heat shield may comprise a mounting tab located on the aft end.

In various embodiments, the gas turbine engine may also comprise a HPT vane support coupled to an inner surface of the diffuser case. The notch of the flange heat shield may be configured to interface with a forward end of the HPT vane support. The mounting tab may be configured to couple the flange heat shield to the forward end of the HPT vane support. In various embodiments, an outer surface of the flange heat shield and an inner surface of the diffuser case may define a gap. In various embodiments, the gas turbine engine may also comprise an airflow ramp located on an inner surface of the diffuser case forward of the landing. In various embodiments, the annular body of the flange heat shield may comprise a plurality of sectional heat shields coupled end to end to form the annular body.

In various embodiments, a combustor section of a gas turbine engine is disclosed. The combustor section may comprise a diffuser case and a flange heat shield disposed within the diffuser case. The flange heat shield may comprise an annular body having a forward end opposite an aft end. The flange heat shield may comprise a radial snap located on the forward end and configured to interface with a landing of the engine case. The flange heat shield may comprise a notch disposed at the aft end, wherein the notch defines a void located on the aft end. The flange heat shield may comprise a mounting tab located on the aft end.

In various embodiments, the combustor section may further comprise a HPT vane support coupled to an inner surface of the diffuser case. The notch of the flange shield may be configured to interface with a forward end of the HPT vane support. The mounting tab may be configured to couple the flange heat shield to the forward end of the HPT vane support. In various embodiments, an outer surface of the flange heat shield and inner surface of the diffuser case may define a gap. In various embodiments, the combustor section may further comprise an airflow ramp located on an inner surface of the diffuser case forward of the landing. In various embodiments, the annular body of the flange heat shield may comprise a plurality of sectional heat shields coupled end to end to form the annular body.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
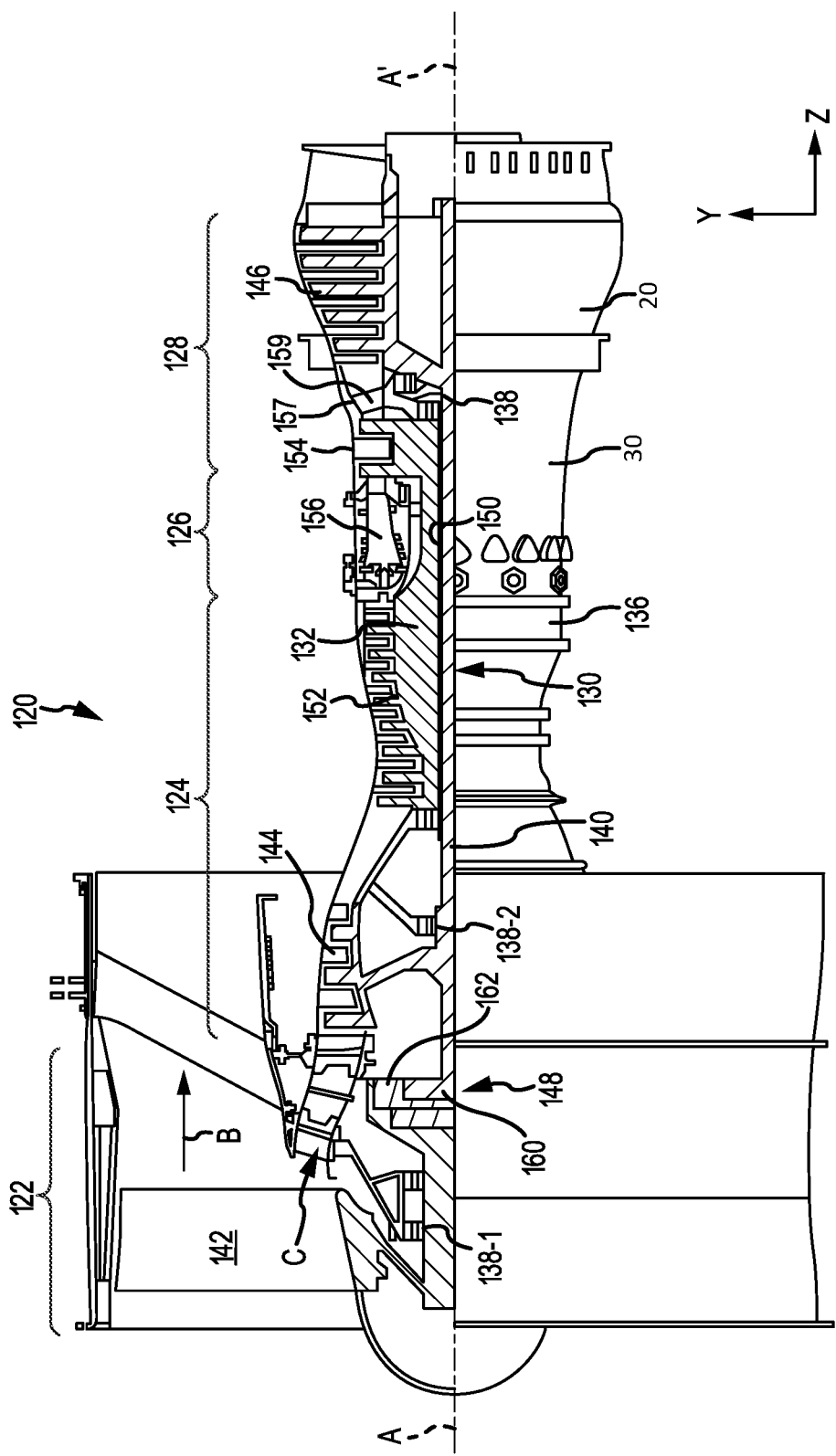
FIG. 1 illustrates a cross-sectional view of a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature.

In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 or engine case via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
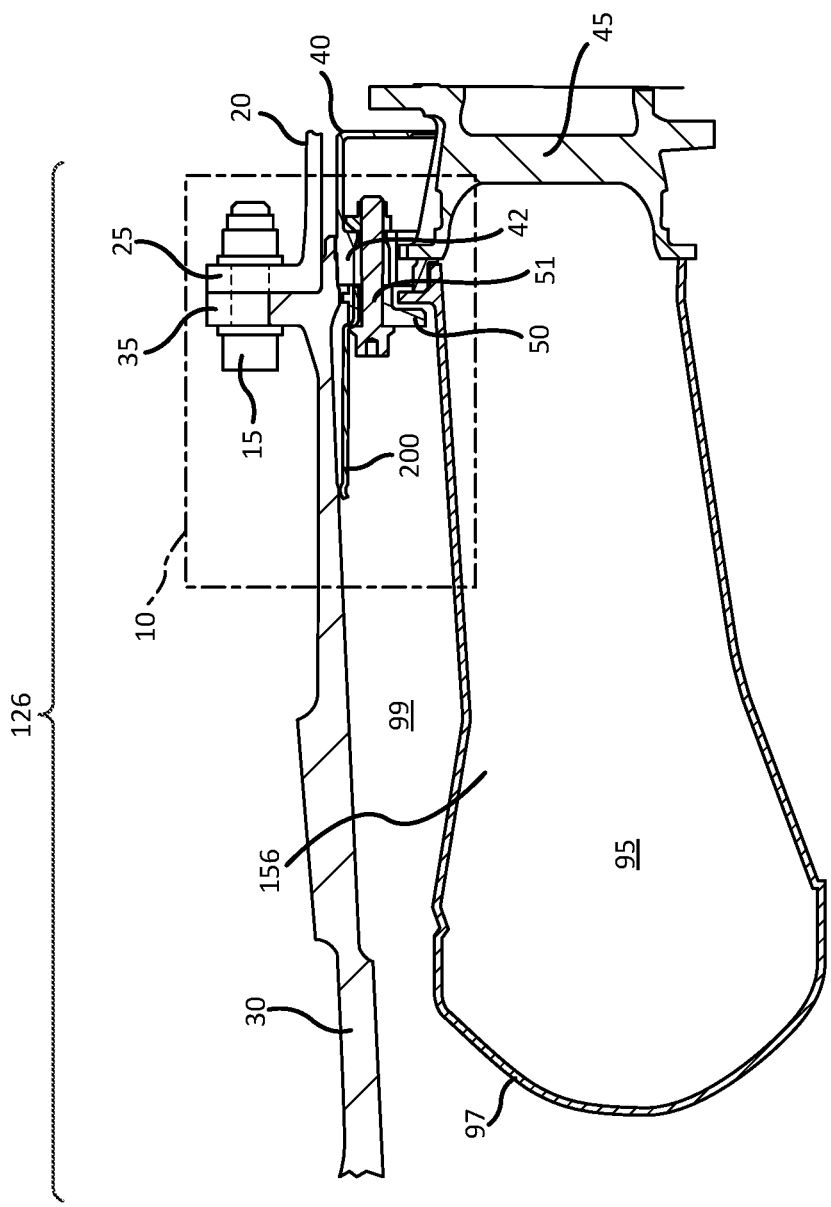
FIG. 2 illustrates a cross-sectional view of a combustor and an engine case of a gas turbine engine including a flange heat shield, in accordance with various embodiments.

In various embodiments, and with reference to FIGS. 1 and 2, a combustor section 126 is depicted. Combustor section 126 may generally include a combustor 156, which may be coupled to an outer diffuser case 30 by a diffuser mount assembly 10. Combustor 156 generally includes a combustion chamber 95 defined by a combustor wall 97. Combustor 156 may be encased by outer diffuser case 30 having an annular geometry and disposed about combustor 156. Outer diffuser case 30 may be spaced radially outward from combustor wall 97 to define an outer plenum 99. Combustor 156 may be disposed aft of the compressor section 124 to receive compressed airflow therefrom. For example, gas leaving high pressure compressor 152 may flow into combustion chamber 95 to supply combustor 156 with air for combustion. Combustion chamber 95 may contain combustion products that flow axially toward turbine section 128. Uncombusted gas may be mixed with fuel and burned in combustion chamber 95. Combusted gas in combustor 156 may reach or exceed temperatures of 3,500° F. (1,925° C.), or higher. Heat may radiate from combustor 156 to other nearby components of gas turbine engine 120, which may cause the nearby components to increase in temperature.

In various embodiments, turbine section 128 may receive combusted gas or exhaust from combustor section 126. In various embodiments, turbine section 128 may include multiple rows of vanes and multiple rows of blades that may rotate about an axis with respect to the vanes. Combusted gas from combustor section 126 may be channeled to turbine section 128 where it can be directed through the turbine vanes and blades. In that regard, high pressure turbine 154 may comprise a plurality of vanes, such as vane 45, and a plurality of blades. Vane 45 may operate as a first stage high pressure turbine vane of high pressure turbine 154. Vane 45 may be coupled to high pressure turbine case 20 by a HPT vane support 40 (e.g., a first stage HPT vane support, and/or the like). Vane 45 and combustor 156 may further couple to outer diffuser case 30 by HPT vane support 40. Combustor 16 may be secured to outer diffuser case 30 and to HPT vane support 40 by a plurality of support locks 50. In various embodiments, diffuser mount assembly 10 may include a plurality of support locks 50 disposed at regular intervals circumferentially around combustor 156. Each support lock 50 and HPT vane support 40 may be configured to receive a fastener 51. Fastener 51 may be passed through a forward end 42 of HPT vane support 40 and support lock 50 to mechanically couple support lock 50 to HPT vane support 40. Fastener 51 may comprise rivets, bolts, and/or any other suitable fastener. Thus, support lock 50 may secure combustor 156 to HPT vane support 40 and to high pressure turbine case 20 and outer diffuser case 30.

In various embodiments, outer diffuser case 30 may couple to high pressure turbine case 20. Outer diffuser case 30 may comprise a diffuser case flange 35 extending radially from outer diffuser case 30 at an aft end of outer diffuser case 30. High pressure turbine case 20 may comprise a HPT case flange 25 extending radially from high pressure turbine case 20 at a forward end of high pressure turbine case 20. Diffuser case flange 35 and HPT case flange 25 may mate together in a directly abutting engagement, and may be secured by a plurality of fasteners 15. Fasteners 15 may be passed through flanges 35, 25 to mechanically couple outer diffuser case 30 and high pressure turbine case 20. Fasteners 15 may comprise rivets, bolts, and/or any other suitable fastener to couple outer diffuser case 30 and high pressure turbine case 20 along flanges 35, 25.

In various embodiments, heat radiating from combustor 156 may introduce thermal loads on outer diffuser case 30 and diffuser case flange 35. For example, heat may convectively transfer from combustor 156 to outer diffuser case 30 and to diffuser case flange 35, resulting in a thermal gradient to diffuser case flange 35. In various embodiments, a flange heat shield 200 may be configured to at least partially block heat radiating from combustor 156 from directly impinging on outer diffuser case 30 and on diffuser case flange 35. In that regard, flange heat shield 200 may be disposed between combustor 156 and outer diffuser case 30. In various embodiments, flange heat shield 200 may extend circumferentially along an inner wall of outer diffuser case 30. In various embodiments, flange heat shield 200 may comprise any suitable shape, such as, for example an annular ring. Flange heat shield 200 may help reduce the thermal gradients in diffuser case flange 35, thereby reducing stress on diffuser case flange 35 and outer diffuser case 30. In various embodiments, flange heat shield 200 may decrease the thermal gradients in diffuser case flange 35 by at least 20% to 30% (relative to an outer diffuser case and diffuser case flange not having a flange heat shield).

Figure 3A:
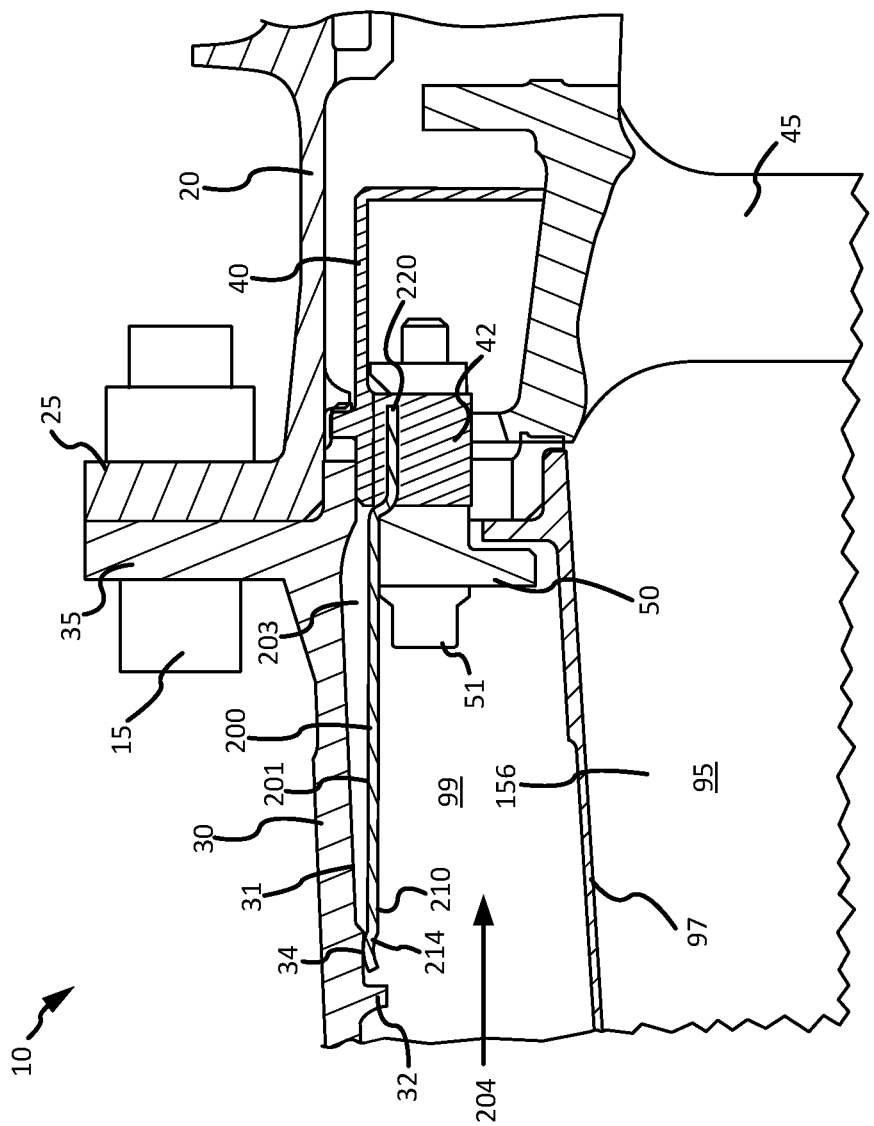
FIG. 3A illustrates a cross-sectional view of a diffuser case assembly comprising a flange heat shield, in accordance with various embodiments.
Figure 3B:
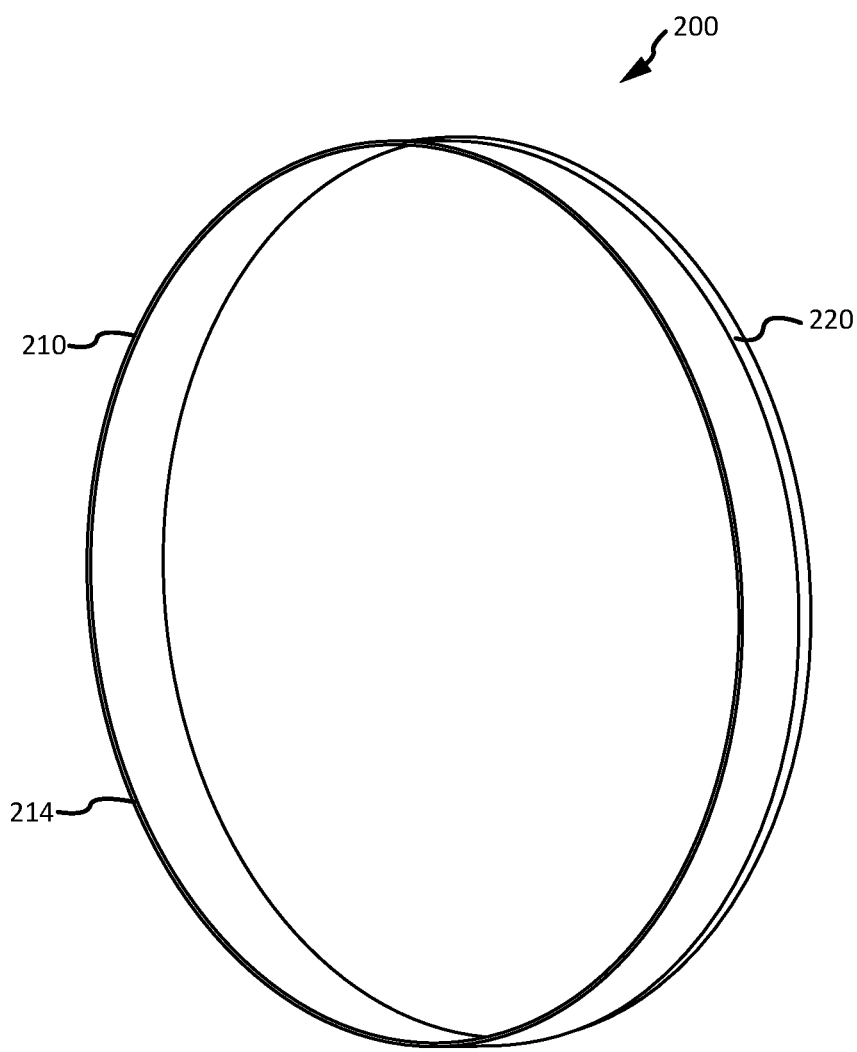
FIG. 3B illustrates a perspective view of a flange heat shield, in accordance with various embodiments.

In various embodiments, and with reference to FIG. 3A, a cross-sectional view of diffuser mount assembly 10 comprising flange heat shield 200 is depicted. With reference to FIGS. 3A and 3B, flange heat shield 200 may be configured to insulate outer diffuser case 30 and diffuser case flange 35 from convective heat transfer from combustor 156 through gas flowing through outer plenum 99. In various embodiments, flange heat shield 200 may comprise any material suitable to provide thermal shielding to diffuser case flange 35, such as for example, a nickel alloy, a nickel chromium alloy (such as that sold under the mark INCONEL, e.g., INCONEL 600, 617, 625, 718, X-70, and the like), and/or the like.

In various embodiments, flange heat shield 200 may comprise any axial length (as measured along an axial direction from forward end 210 to aft end 220) suitable to provide thermal shielding to diffuser case flange 35. In that regard, the axial length of flange heat shield 200 may be selected based on factors such as desired weight, desired thermal shielding, gas turbine engine size, and/or the like. For example, and in various embodiments, flange heat shield 200 may comprise an axial length of about 1.0 inch (2.54 cm) to about 2.0 inches (5.08 cm), about 2.0 inches (5.08 cm) to about 3.0 inches (7.62 cm), or about 3.0 inches (7.62 cm) to about 5.0 inches (12.7 cm) (wherein about in this context refers only to +/−0.01 inches (0.0254 cm)).

In various embodiments, flange heat shield 200 may also comprise any thickness (as measured across a radial distance from an outer surface to an inner surface of flange heat shield 200) suitable to provide thermal shielding to diffuser case flange 35. The thickness of flange heat shield 200 may vary according to various design, weight, and thermal considerations and may be uniform or may vary along an axial length of flange heat shield 200. In various embodiments, flange heat shield 200 may also comprise any thickness suitable to withstand natural frequencies and vibrations during engine operation. For example, and in various embodiments, flange heat shield 200 may comprise a thickness of about 0.03 inches (0.076 cm) to about 0.04 inches (0.102 cm), about 0.04 inches (0.102 cm) to about 0.08 inches (0.203 cm), about 0.08 inches (0.203 cm) to about 0.15 inches (0.381 cm), or about 0.15 inches (0.381 cm) to about 0.25 inches (0.635 cm) (wherein about in this context refers only to +/−0.005 inches (0.017 cm)).

In various embodiments, flange heat shield 200 may be configured to remain radially spaced apart from outer diffuser case 30 during both a first engine state and a second engine state, e.g., a hot state and a cold state, thereby reducing thermal conduction between flange heat shield 200 and outer diffuser case 30. In that regard, an outer surface 201 of flange heat shield 200 and an inner surface 31 of outer diffuser case 30 may define a gap 203. Gap 203 may be disposed between flange heat shield 200 and outer diffuser case 30. Gap 203 may extend axially and circumferentially along and between flange heat shield 200 and outer diffuser case 30. Gap 203 may be configured such that a conductive thermal path is reduced or eliminated between flange heat shield 200 and outer diffuser case 30. Gap 203 may also be configured to reduce or eliminate convective heat transfer between flange heat shield 200 and outer diffuser case 30. As such, flange heat shield 200 may be configured to reduce or eliminate convective heat transfer between combustor 156 and outer diffuser case 30, thereby decreasing the temperature of diffuser case flange 35. A lower temperature of diffuser case flange 35 may reduce thermal gradients and stress experienced by diffuser case flange 35, thus tending to increase the operational life of diffuser case flange 35 and outer diffuser case 30.

In various embodiments, flange heat shield 200 may comprise a forward end 210 located forward and opposite an aft end 220. In various embodiments, forward end 210 may be in contact with a landing 34 of outer diffuser case 30. Landing 34 may comprise a substantially flat portion of inner surface 31 of outer diffuser case 30, configured to provide a contact surface for forward end 210. In various embodiments, forward end 210 may comprise a radial snap 214 configured to interface with landing 34. Radial snap 214 may also be configured to apply pressure in a radial direction against landing 34. In that regard, radial snap 214 may reduce airflow between flange heat shield 200 and outer diffuser case 30 into gap 203. Radial snap 214 may also enable forward end 210 of flange heat shield 200 to remain unattached or free-floating with respect to outer diffuser case 30. During an operating state, such as a "hot" state (e.g., operation at high throttle), the temperature of engine components may increase, causing thermal expansion of flange heat shield 200, and/or other engine components. In various embodiments, a free-floating configuration of forward end 210 of flange heat shield 200 enables thermal expansion of flange heat shield 200, and/or other engine components, while avoiding damage to flange heat shield 200. As thermal expansion expands and moves engine components closer together, the unattached end (forward end 210) of flange heat shield 200 may protect flange heat shield 200 from damage by providing tolerance for flange heat shield 200 to thermally expand.

In various embodiments, and with reference to FIG. 3A, outer diffuser case 30 may also comprise an airflow ramp 32 configured to redirect airflow away from flange heat shield 200. In various embodiments, airflow ramp 32 may also be configured to at least partially prevent airflow into gap 203 between flange heat shield 200 and outer diffuser case 30. Airflow ramp 32 may protrude in a radial direction inward from outer diffuser case 30 (towards combustor 156). Airflow ramp 32 may be located on inner surface 31 of outer diffuser case 30 in any suitable location, such as, for example, forward of landing 34. Airflow ramp 32 may comprise any suitable size and/or shape to at least partially interrupt and/or redirect airflow away from flange heat shield 200. For example, core airflow C may generally flow through combustor section 126 in the direction of arrow 204. During engine operation, core airflow C, and/or other airflows, may increase in temperature. Airflow ramp 32 may interrupt and/or redirect airflow from core airflow C in the direction of arrow 204, thereby further reducing thermal stress on flange heat shield 200 and diffuser case flange 35.

Figure 4A:
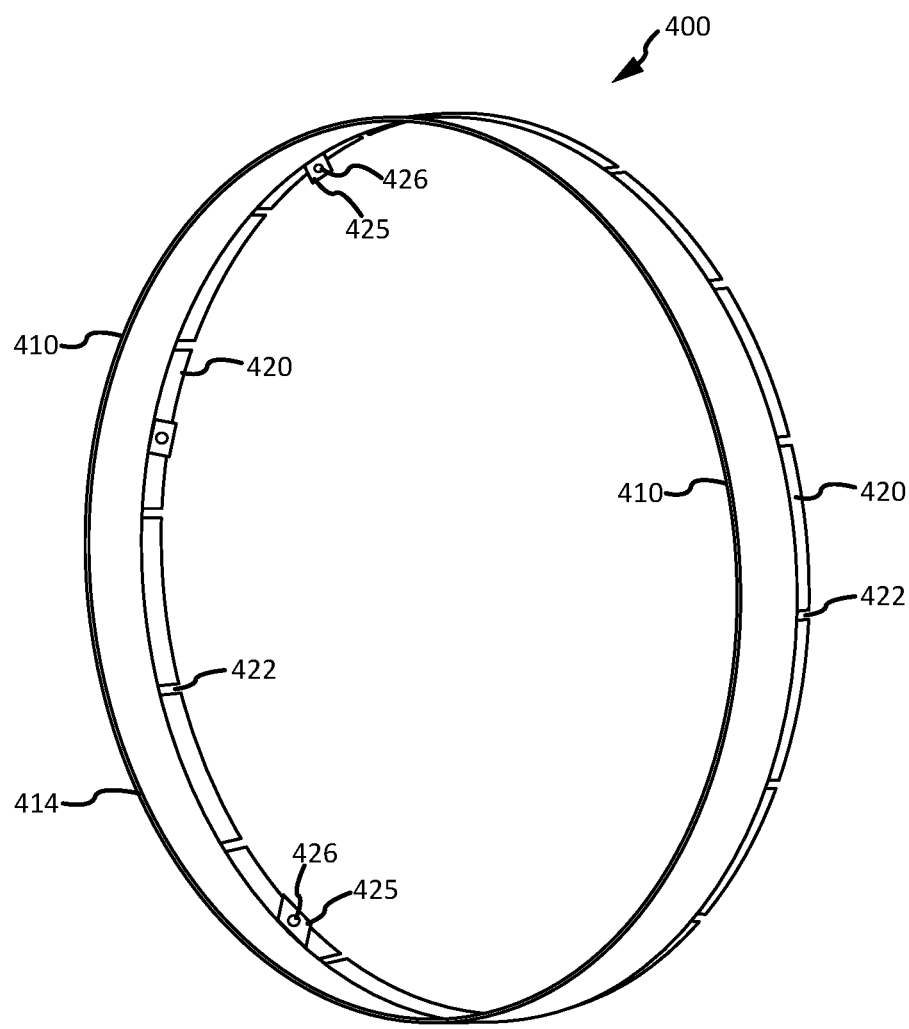
FIG. 4A illustrates a perspective view of a flange heat shield comprising notches and mounting tabs, in accordance with various embodiments.
Figure 4B:
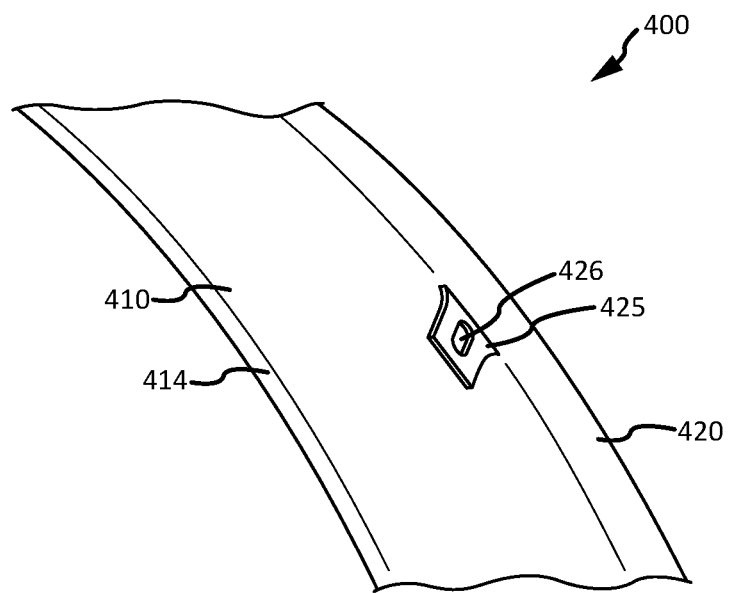
FIG. 4B illustrates a perspective view of a mounting tab for a flange heat shield, in accordance with various embodiments.
Figure 4C:
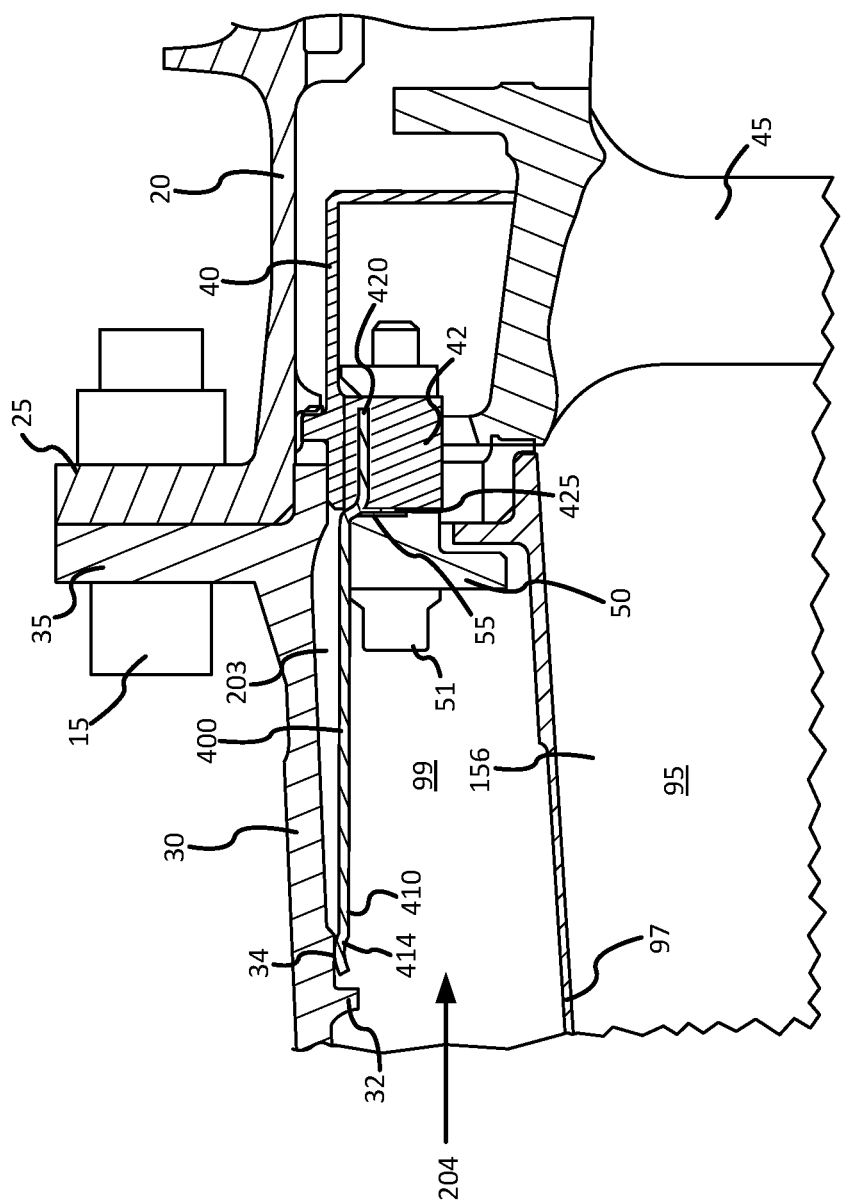
FIG. 4C illustrates a cross-sectional view of an engine case of a gas turbine engine comprising a flange heat shield having notches and mounting tabs, in accordance with various embodiments.

In various embodiments, aft end 220 of flange heat shield 200 may be configured to couple flange heat shield 200 to support lock 50 and HPT vane support 40. Aft end 220 may couple to support lock 50 and HPT vane support 40 using any suitable method. For example, and in various embodiments, with reference to FIGS. 4A, 4B, and 4C, a flange heat shield 400 having a plurality of notches 422 and mounting tabs 425 is disclosed. Flange heat shield 400 may comprise notches 422 located on aft end 420 of flange heat shield 200. Notches 422 may be disposed at regular intervals circumferentially around aft end 420, corresponding with forward end 42 of HPT vane support 40, as depicted in FIG. 4C. In that regard, notches 422 may define a void on aft end 420 configured to receive at least a portion of forward end 42 of HPT vane support 40. For example, notches 422 may receive at least a portion of forward end 42 in response to flange heat shield 200 being installed within diffuser mount assembly 10. Notches 422 are depicted with a rectangular cross section, however, it is to be understood that notches 422 may comprise any shape complementary to forward end 42. Moreover, notches 422 may also comprise any suitable size complementary to forward end 42.

In various embodiments, flange heat shield 400 may comprise a plurality of mounting tabs 425 located on aft end 420 of flange heat shield 400. Mounting tabs 425 may be located on aft end 420 and may extend radially inward from flange heat shield 400. Mounting tabs 425 may be configured to couple flange heat shield 400 to support locks 50 and HPT vane support 40. In that regard, mounting tabs 425 may comprise an aperture 426 configured to receive fastener 51. With reference to FIG. 4C, fastener 51 may be passed through support lock 50, aperture 426 of mounting tab 425, and forward end 42 of HPT vane support 40 to mechanically couple flange heat shield 400 to support lock 50 and HPT vane support 40. In various embodiments, support lock 50 may comprise a mounting slot 55 configured to receive mounting tabs 425 to allow for coupling. In that respect, mounting slot 55 may comprise any suitable shape and/or size capable of receiving mounting tabs 425 to allow for coupling. Mounting tabs 425 are depicted with a rectangular cross section, however, it is to be understood that mounting tabs 425 may comprise any suitable and/or desired shape.

Figure 5:
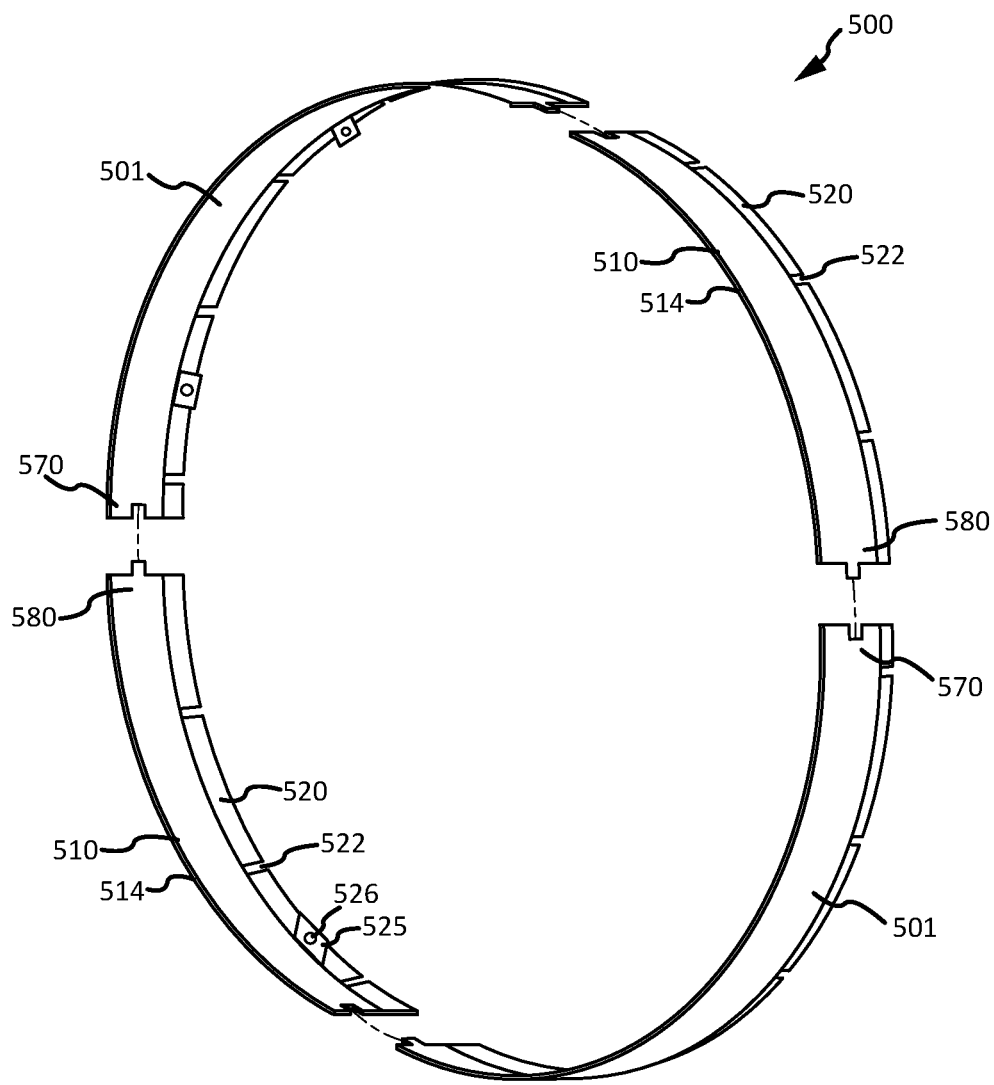
FIG. 5 illustrates a perspective view of a flange heat shield comprising sectional heat shields, in accordance with various embodiments.

In various embodiments, flange heat shield 400 may be circumferentially continuous (e.g., annular or ring shaped). With brief reference to FIG. 4C, flange heat shield 400 having annular geometry may interface with and fit within outer diffuser case 30, with brief reference to FIG. 4C, which may also have annular geometry. Flange heat shield 400 may be manufactured via forging, casting, electrical discharge machining (EDM), additive manufacturing, machining, and/or the like. In various embodiments, and with reference to FIG. 5, flange heat shield 500 may comprise a plurality of sectional heat shields 501. Each sectional heat shield 501 may couple end to end to form flange heat shield 500. Sectional heat shields 501 may couple together using any suitable technique, such as via welding, brazing, and/or the like. For example, each sectional heat shield 501 may comprise a female end 570 opposite a male end 580. Female end 570 may be configured to operatively interface with male end 580 to couple each sectional heat shield 501 together. For example, male end 580 may comprise a protrusion extending from male end 580, and female end 570 may comprise a complimentary void configured to receive male end 580 to couple each sectional heat shield 501 together.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flange heat shield for an engine case of a gas turbine engine, comprising:
   an annular body having a forward end opposite an aft end and a uniform thickness in a radial direction from the forward end to the aft end;
   a radial snap located on the forward end and defining a radially outward facing convex surface configured to interface with a landing of the engine case and a radially inward facing concave surface spaced from the radially outward facing surface by the uniform thickness;
   a notch disposed at the aft end, wherein the notch defines a void located on the aft end;
   a mounting tab located on the aft end,
      wherein the notch of the flange heat shield is configured to interface with a forward end of a high pressure turbine vane support coupled to an inner surface of the engine case and
      wherein the mounting tab is configured to couple the flange heat shield to the forward end of the high pressure turbine vane support; and
   a support lock having a mounting slot configured to receive the mounting tab, the support lock configured to couple the mounting tab to the forward end of the high pressure turbine vane support.

2. The flange heat shield of claim 1, wherein an outer surface of the flange heat shield and an inner surface of the engine case define a gap.

3. The flange heat shield of claim 1, further comprising an airflow ramp located on an inner surface of the engine case forward of the landing.

4. The flange heat shield of claim 1, wherein the annular body comprises a plurality of sectional heat shields coupled end to end to form the annular body.

5. The flange heat shield of claim 1, wherein the engine case comprises a diffuser case.

6. A gas turbine engine, comprising:
   a combustor;
   a diffuser case disposed about the combustor; and
   a flange heat shield disposed between the combustor and the diffuser case, the flange heat shield comprising:
      an annular body having a forward end opposite an aft end and a uniform thickness in a radial direction from the forward end to the aft end;
      a radial snap located on the forward end and defining a radially outward facing convex surface configured to interface with a landing of the diffuser case and a radially inward facing concave surface spaced from the radially outward facing surface by the uniform thickness;
      a notch disposed at the aft end, wherein the notch defines a void located on the aft end; and
      a mounting tab located on the aft end;
   a high pressure turbine vane support coupled to an inner surface of the diffuser case,
      wherein the notch of the flange heat shield is configured to interface with a forward end of the high pressure turbine vane support, and
      wherein the mounting tab is configured to couple the flange heat shield to the forward end of the high pressure turbine vane support; and
   a support lock having a mounting slot configured to receive the mounting tab, the support lock configured to couple the mounting tab to the forward end of the high pressure turbine vane support.

7. The gas turbine engine of claim 6, wherein an outer surface of the flange heat shield and an inner surface of the diffuser case define a gap.

8. The gas turbine engine of claim 6, further comprising an airflow ramp located on an inner surface of the diffuser case forward of the landing.

9. The gas turbine engine of claim 6, wherein the annular body of the flange heat shield comprises a plurality of sectional heat shields coupled end to end to form the annular body, each one of the plurality of sectional heat shields including a protrusion at a circumferential end configured to engage a void of an adjacent one of the plurality of sectional heat shields.

10. A combustor section of a gas turbine engine, comprising:
    a diffuser case; and
    a flange heat shield disposed within the diffuser case, the flange heat shield comprising:

an annular body having a forward end opposite an aft end and a uniform thickness in a radial direction from the forward end to the aft end;

a radial snap located on the forward end and defining a radially outward facing convex surface configured to interface with a landing of the diffuser case and a radially inward facing concave surface spaced from the radially outward facing surface by the uniform thickness;

a notch disposed at the aft end, wherein the notch defines a void located on the aft end; and a mounting tab located on the aft end;

a high pressure turbine vane support coupled to an inner surface of the diffuser case, wherein the notch of the flange heat shield is configured to interface with a forward end of the high pressure turbine vane support, and wherein the mounting tab is configured to couple the flange heat shield to the forward end of the high pressure turbine vane support; and a support lock having a mounting slot configured to receive the mounting tab, the support lock configured to couple the mounting tab to the forward end of the high pressure turbine vane support.

11. The combustor section of claim 10, wherein an outer surface of the flange heat shield and an inner surface of the diffuser case define a gap.

12. The combustor section of claim 10, further comprising an airflow ramp located on an inner surface of the diffuser case forward of the landing.

13. The combustor section of claim 10, wherein the annular body of the flange heat shield comprises a plurality of sectional heat shields coupled end to end to form the annular body.

* * * * *